United States Patent
Hicks, III et al.

(10) Patent No.: US 9,495,865 B2
(45) Date of Patent: Nov. 15, 2016

(54) POWER-LINE COMMUNICATIONS

(71) Applicant: AT&T Intellectual Property I, L.P., Atlanta, GA (US)

(72) Inventors: John Alson Hicks, III, Roswell, GA (US); Brett Davis, Suwanee, GA (US); Glenn Howell, Lilburn, GA (US); Robin Thomas, New York, NY (US); James A. Worsham, Buford, GA (US); Randy S. Zimler, Gainesville, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 10 days.

(21) Appl. No.: 14/552,154

(22) Filed: Nov. 24, 2014

(65) Prior Publication Data

US 2016/0148499 A1   May 26, 2016

(51) Int. Cl.
| | | |
|---|---|---|
| *G08B 25/10* | (2006.01) | |
| *G08B 29/18* | (2006.01) | |
| *H04L 12/66* | (2006.01) | |
| *H04B 3/54* | (2006.01) | |
| *H04L 12/28* | (2006.01) | |
| *G08B 25/00* | (2006.01) | |
| *G08B 25/06* | (2006.01) | |
| *G08B 25/08* | (2006.01) | |
| *H04L 12/10* | (2006.01) | |

(52) U.S. Cl.
CPC .......... *G08B 29/181* (2013.01); *G08B 25/009* (2013.01); *G08B 25/06* (2013.01); *G08B 25/08* (2013.01); *H04B 3/54* (2013.01); *H04L 12/2803* (2013.01); *H04L 12/66* (2013.01); *H04L 12/10* (2013.01)

(58) Field of Classification Search
CPC ........ H04B 3/544; H04B 3/546; H04B 3/58; G08B 25/06; G08B 25/10

USPC ................. 340/506, 507, 510; 375/211, 257
See application file for complete search history.

(56) References Cited

U.S. PATENT DOCUMENTS

| | | |
|---|---|---|
| 6,980,091 B2 | 12/2005 | White, II et al. |
| 7,245,212 B2 | 7/2007 | Cope et al. |
| 7,339,458 B2 | 3/2008 | Cern |
| 7,382,232 B2 | 6/2008 | Gidge et al. |
| 8,076,792 B2 | 12/2011 | Shima et al. |
| 8,138,910 B2 | 3/2012 | Iwai |
| 8,154,150 B2 | 4/2012 | Sakai et al. |
| 8,541,903 B2 | 9/2013 | Burk |
| 8,549,340 B2 | 10/2013 | Hua et al. |
| 8,653,952 B2 | 2/2014 | Abe et al. |
| 2005/0226200 A1 | 10/2005 | Askildsen et al. |
| 2005/0267605 A1 | 12/2005 | Lee et al. |
| 2007/0076505 A1 | 4/2007 | Radtke et al. |
| 2007/0220907 A1* | 9/2007 | Ehlers .................. F25B 49/005 62/126 |
| 2008/0143491 A1 | 6/2008 | Deaver |
| 2008/0153415 A1* | 6/2008 | Block ................ H04B 7/15528 455/15 |
| 2009/0189774 A1 | 7/2009 | Brundridge et al. |
| 2009/0212926 A1* | 8/2009 | Du .......................... G08B 25/06 340/12.39 |
| 2010/0238003 A1* | 9/2010 | Chan ..................... G01D 4/004 340/538 |

* cited by examiner

*Primary Examiner* — Kevin Kim
(74) *Attorney, Agent, or Firm* — Scott P. Zimmerman, PLLC

(57) ABSTRACT

Methods, systems, and products bridge wireless data transmissions with power-line communications. Should a failure occur in alternating current power, a backup battery maintains the power-line communications. Direct current battery power is used to power a wireless transceiver, thus maintaining both wireless data transmissions and communication during power failures.

19 Claims, 17 Drawing Sheets

POWER-LINE COMMUNICATIONS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Security systems are common in homes and businesses. A security system alerts occupants to intrusions, fire, and other hazards. Security systems, though, are sometimes difficult to install and inoperable during an electrical outage.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
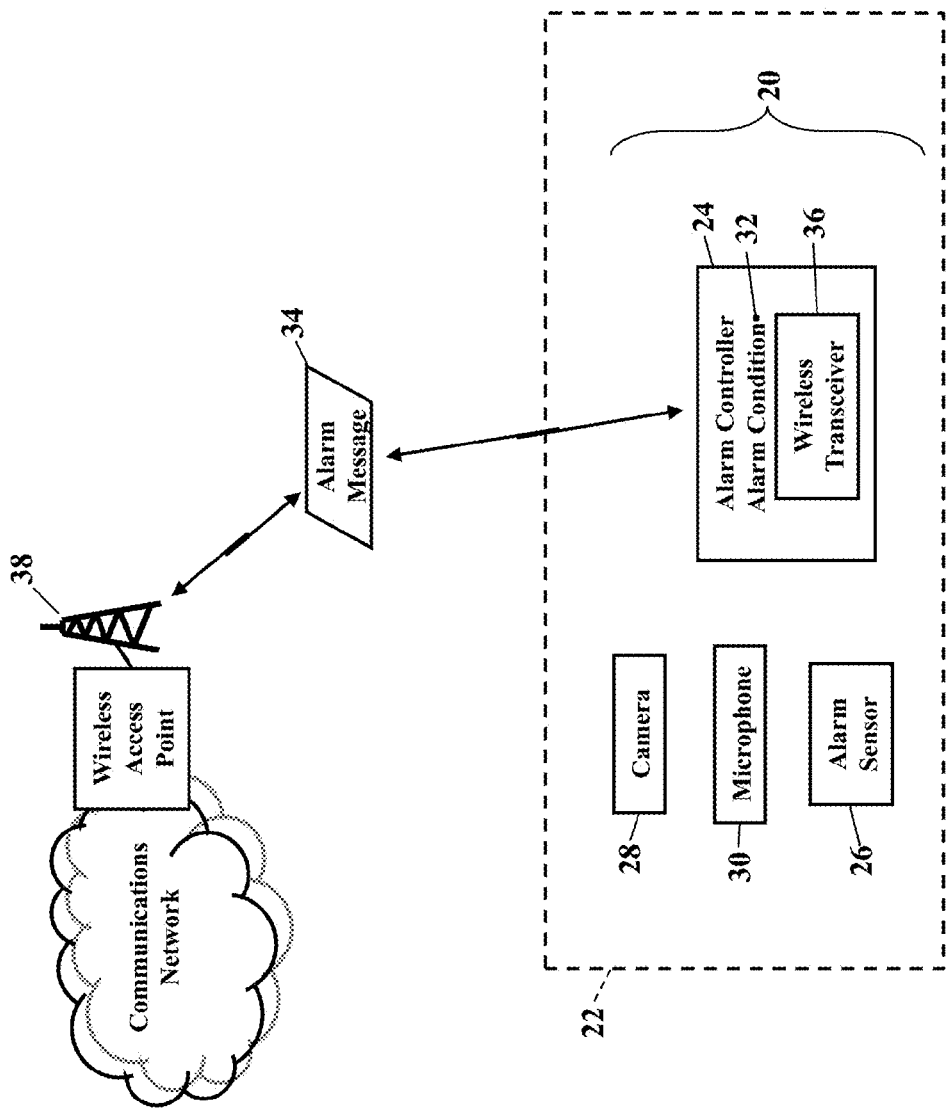
FIGS. 1-2 illustrate a conventional installation of a security system.
Figure 2:
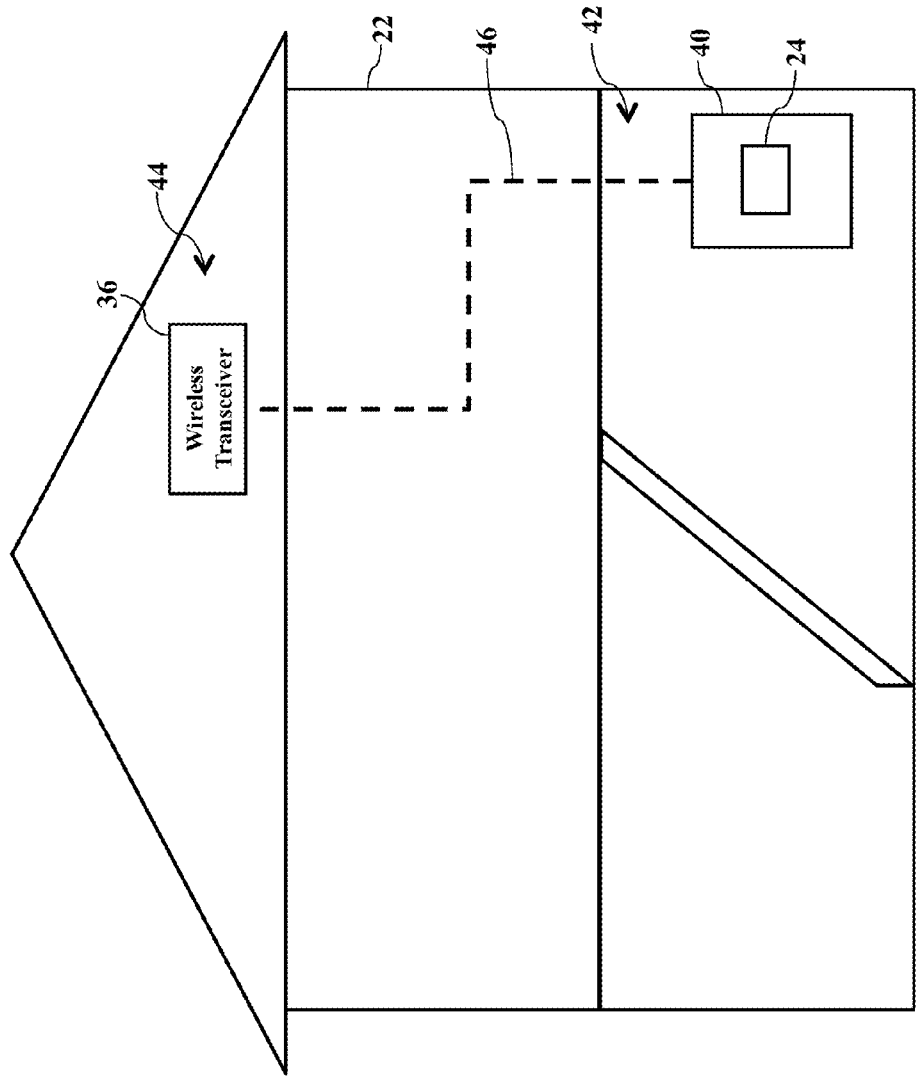

FIGS. 1-2 illustrate a conventional installation of a security system 20. FIGS. 1-2 illustrate the security system 20 installed in a building 22, such as a home or business. The security system 20 has an alarm controller 24 that receives information from one or more alarm sensors 26, cameras 28, and/or microphones 30. As the reader likely understands, the security system 20 monitors for heat, smoke, motion, gases, sound, or any other physical or logical parameter that may indicate a security event. Should sensory inputs indicate an alarm condition 32 (such as detection of an intrusion or other emergency), the security system 20 generates an alarm message 34. The alarm system 20 has a wireless transceiver 36 that transmits the alarm message 34 to a wireless access point 38, such as a cellular base station. The alarm message 34 is then routed and processed to alert emergency personnel, as is known.

Installation, though, often compromises radio reception. As FIG. 2 illustrates, the alarm controller 24 is usually mounted inside a cabinet 40, which nearly all customers prefer hidden from view. For example, some customers prefer the cabinet 40 installed in a concealed basement location (illustrated as reference numeral 42). Other customers prefer the cabinet 40 installed in closets, utility rooms, and other concealed locations. These concealed installations, though, often compromise wireless reception. For example, cellular data signal strength in these concealed locations is sometimes too weak to reliably transmit fire and intrusion alarms using cellular data. Other wireless technologies and standards (such as BLUETOOTH® and WI-FI®) also suffer from weak wireless reception at these concealed installations. The installing technician is thus often compelled to remotely install the wireless transceiver 36 near a window, outside wall, or in an attic (illustrated as reference numeral 44) to obtain adequate cellular data signal strength. Previously these remote installations require a new run of cable (illustrated as reference numeral 46) from the alarm controller 24, which is very expensive and may damage internal plumbing and other structures.

Figure 3:
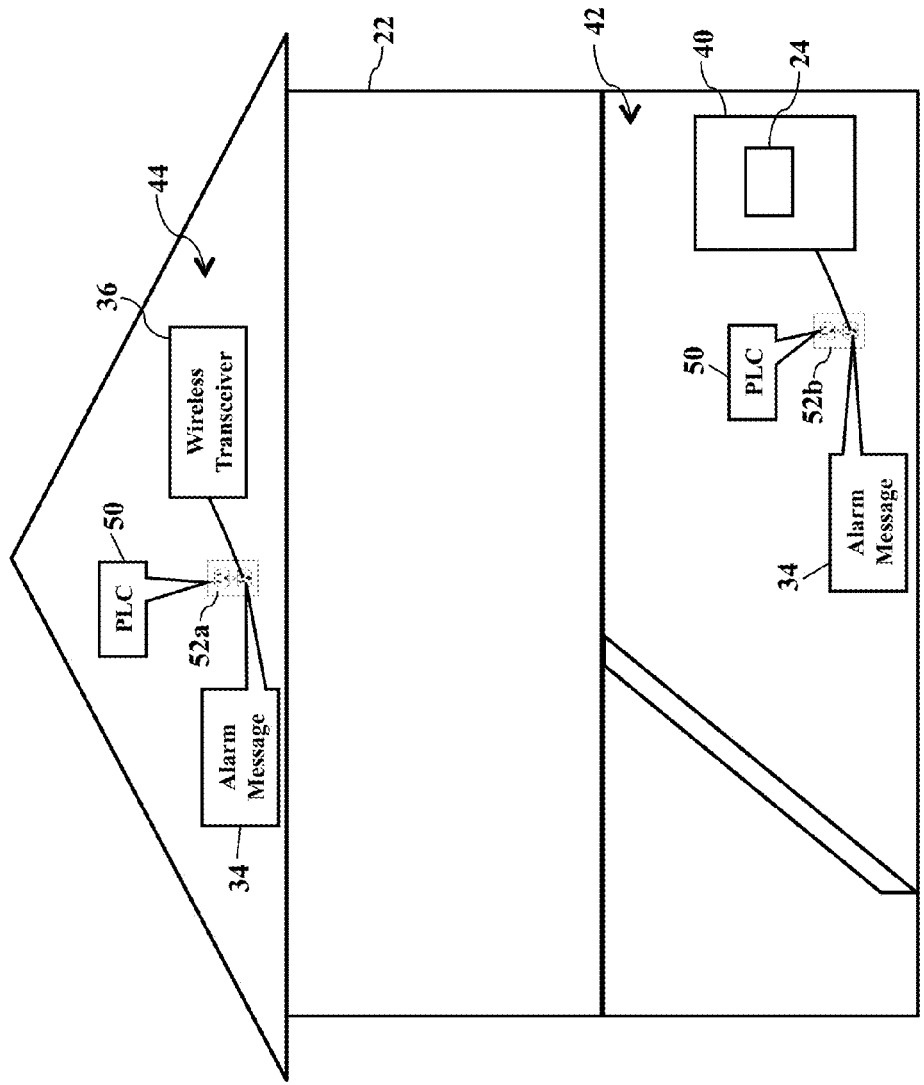
FIG. 3 is a simple schematic illustrating an installation solution, according to exemplary embodiments.

FIG. 3 is a simple schematic illustrating an installation solution, according to exemplary embodiments. Exemplary embodiments utilize existing electrical wiring to provide communications between the alarm controller 24 and the wireless transceiver 36. That is, the alarm controller 24 and the wireless transceiver 36 communicate using power-line communications (or "PLC") 50 over the existing electrical wiring (not shown for simplicity). In simple words, the alarm controller 24 receives electrical power from a nearby conventional socket-type receptacle outlet 52a, which later paragraphs will explain. The wireless transceiver 36 also receives electrical power from its nearby conventional socket-type receptacle outlet 52b, which the later paragraphs will also explain. The alarm controller 24 and the wireless transceiver 36 thus send and receive both data and electrical power using the electrical wiring in the home or office. So, when the alarm controller 24 sends the alarm message 34, the alarm message 34 propagates along an electrical connection between the receptacle outlet 52a and the receptacle outlet 52b. The alarm message 44, in other words, conveys into the receptacle outlet 52a and along the electrical wiring to the receptacle outlet 52b for receipt by the wireless transceiver 36.

Installation is thus greatly simplified. Power-line communications 50 allows the wireless transceiver 36 to be remotely installed from the cabinet 40 (containing the alarm controller 24). The alarm controller 24 may be thus installed in most any concealed location (such as the basement 42), and yet the wireless transceiver 36 may be separately and remotely located for optimum reception. FIG. 3 illustrates the wireless transceiver 36 installed at the receptacle outlet 52b in the attic 44, which is often a location of adequate radio reception. However, the wireless transceiver 36 may be remotely installed at any interior or exterior location desired. As long as any conventional receptacle outlet 52 is proximate the wireless transceiver 36, the power-line communications 50 allows the alarm controller 24 and the wireless transceiver 36 to communicate data and messages. Exemplary embodiments thus speed and simplify installation by eliminating a new run of cable from the alarm controller 24.

Signal reception is also improved. Because the wireless transceiver 36 is remotely installed, the wireless transceiver 36 may be located for best radio reception. Security services often utilize cellular data as the primary technology for the communication of Life Safety Alarms (Fire and Intrusion) to a central monitoring station. Conventionally, a cellular data transceiver is installed inside the security cabinet 40 alongside the alarm controller 24. Exemplary embodiments, instead, allow the wireless transceiver 36 to be remotely installed where wireless reception is best. For example, an installing technician may roam the customer's premises and determine the best location for the best received signal strength indicator (or "RSSI"). The installing technician thus optimizes the location of the wireless transceiver 36 independently from optimizing the location of the alarm controller 24.

Figure 4:
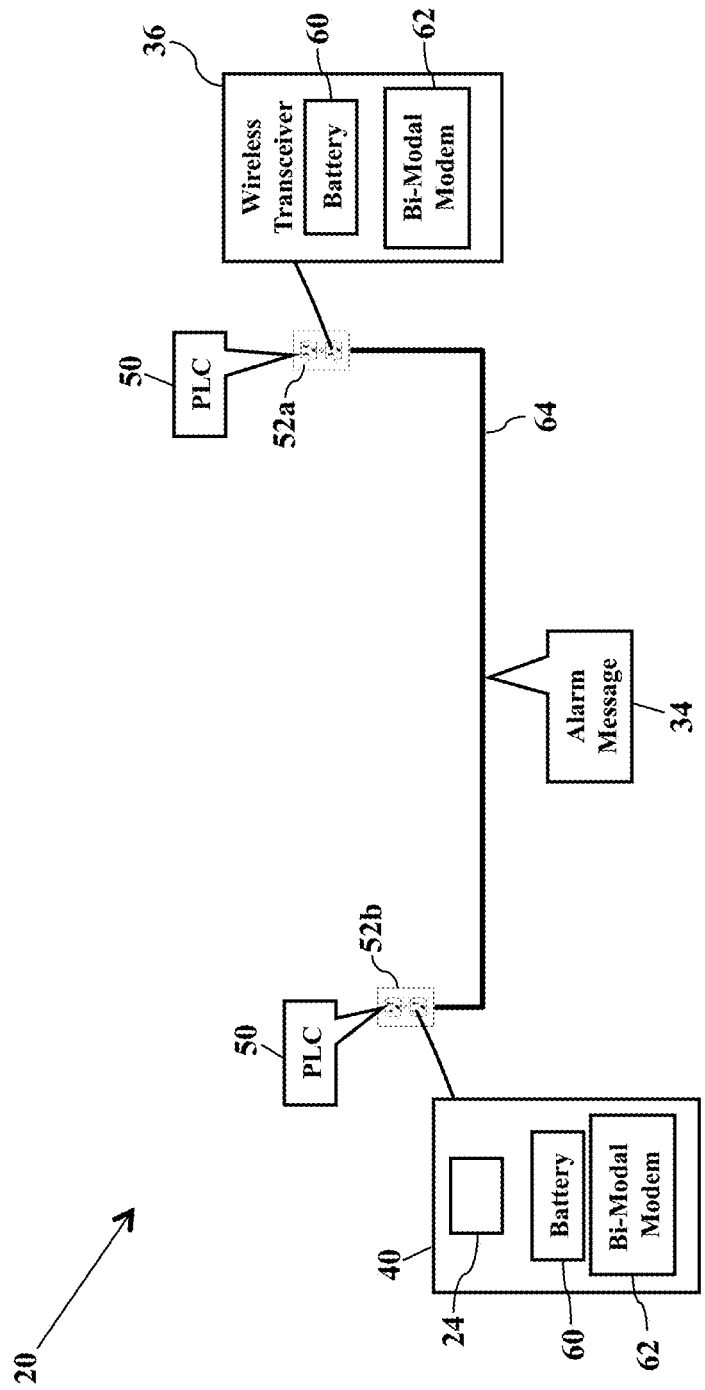
FIG. 4 is a simple schematic illustrating battery backup, according to exemplary embodiments.

FIG. 4 is a simple schematic illustrating battery backup, according to exemplary embodiments. Even though the power-line communications 50 improve installation and reception, the power-line communications 50 may be susceptible to an electrical outage. As the reader likely understands, the security system 20 requires electricity to operate. That is, the alarm controller 24 operates when alternating current ("AC") electrical power is received from the electrical receptacle outlet 52a. The remote wireless transceiver 36 also operates when the AC electrical power is received from the electrical receptacle outlet 52b. However, when an electrical outage occurs, no electrical power is received from the outlets 52a and 52b. The alarm controller 24 and the wireless transceiver 36 may be unable to operate, thus comprising the security of the occupants.

Exemplary embodiments maintain the power-line communications 50. As FIG. 4 illustrates, the alarm controller 24 may have a backup battery 60 that provides electrical power to a bi-modal modem 62. The backup battery 60 is preferably charged (or recharged) when the alternating current ("AC") electrical power is received. Nonetheless, the bi-modal modem 62 may have two operating modes. When electrical power is present on the electrical wiring 64, then the bi-modal modem 62 may operate as a power-line communications ("PLC") modem. However, during an electrical outage (when no electrical power is present on the electrical wiring 64), then the bi-modal modem 62 may operate as a modulator/demodulator using battery backup power 60. The wireless transceiver 36 may also have its own backup battery 60 that provides electrical power to its bi-modal modem 62. These backup batteries 60 maintain the data communications 50 between the alarm controller 24 and the wireless transceiver 36. So, even though a power outage may occur, each bi-modal modem 62 remains operational, thus maintaining the data communications 50 between the alarm controller 24 and the wireless transceiver 36. The electrical wiring 64 can be utilized for communication between the bi-modal modems 62 during electrical outages, thus maintaining messaging and signaling between the alarm controller 24 and the wireless transceiver 36. The alarm controller 24 remains in communication with the remote wireless transceiver 38, thus maintaining important security functions during electrical outages. The electrical wiring 64 can be utilized for communication between the bi-modal modems 62 during electrical outages, thus allowing the alarm message 34 to convey from the alarm controller 24 to the wireless transceiver 36.

Exemplary embodiments enhance safety and security. During electrical outages wherein there is little or no electrical energy on the electrical wiring 64, the bi-modal modems 62 recognize the power outage and may change their mode of operation to operate as modulator/demodulator devices communicating over the electrical wiring 64 using backup battery power 60. When operating as modulator/demodulator devices during an electrical outage, a signal generator in one of the bi-modal modems 62 may modulate a data signal onto the electrical wiring 64. A signal receiver in the other one of the bi-modal modems 62 may receive the modulated signal and perform demodulation. Each of the bi-modal modems 62 may sequentially or alternatively revert between modulator and demodulator to enable two-way communication. One of the bi-modal modems 62 may also provide a synchronization timer to facilitate two-way communication. Exemplary embodiments thus remain compliant with standard UL 985, which specifies requirements for household fire warning system units. In simple words, UL 985 requires that the security system 20 operate for a minimum of twenty four (24) hours and four (4) minutes during a local AC power failure.

Backup battery power keeps the bi-modal modems 62 operational, so the security system 20 continues to operate during electrical outages.

Figure 5:
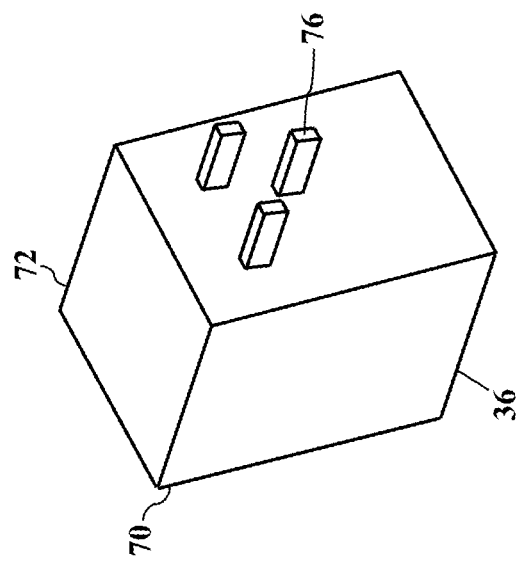
FIGS. 5-7 are more detailed schematics illustrating the installation solution, according to exemplary embodiments.
Figure 6:
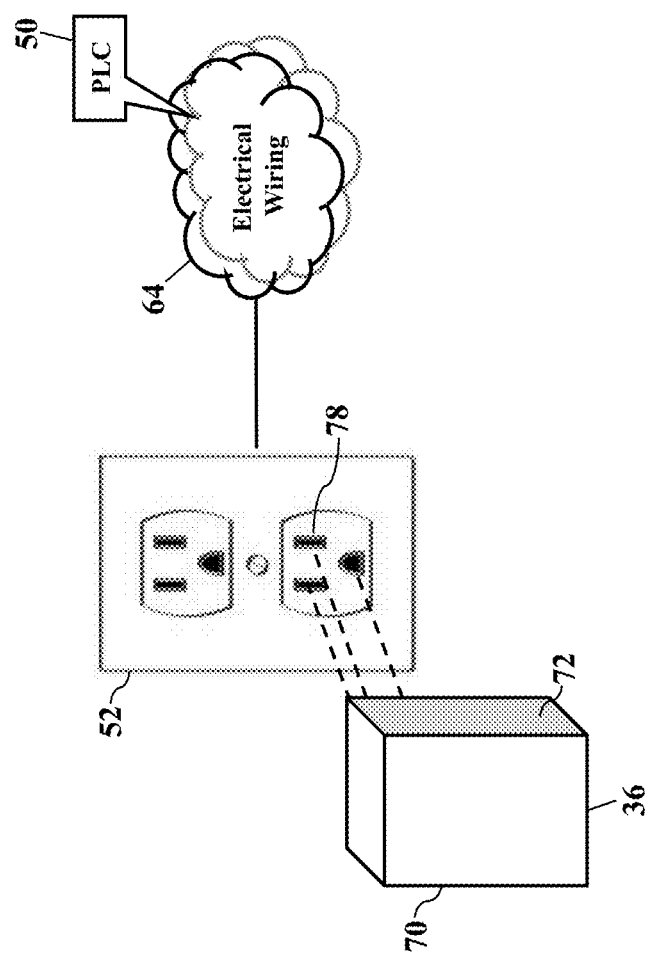
Figure 7:
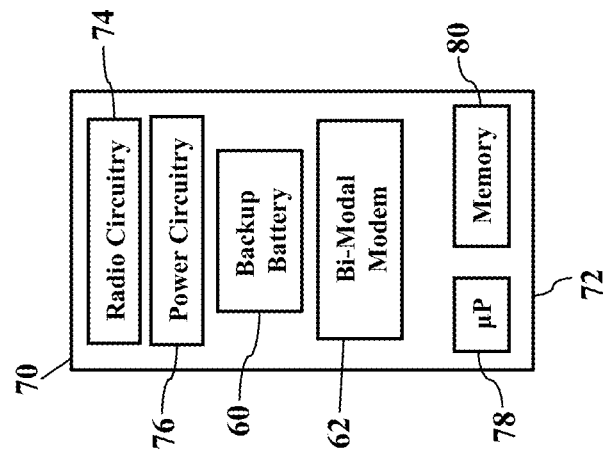

FIGS. 5-7 are more detailed schematics illustrating the installation solution, according to exemplary embodiments. FIGS. 5-6 illustrate the wireless transceiver 36 as a portable, compact, and self-contained bridge unit 70. FIG. 7 illustrates a block diagram of the bridge unit 70. The bridge unit 70 has an outer housing or enclosure 72 that internally contains its componentry. The bridge unit 70 houses cellular radio circuitry 74, power circuitry 76, and the bi-modal modem 62. While the housing or enclosure 72 may have any shape and configuration, the bridge unit 70 is preferably about 2×2×2 cubic inches, thus conveniently fitting within the palm of a human hand. The bridge unit 70 has parallel male blades or pins 76 that insert into the receptacles 78 of the receptacle outlet 52. When the bridge unit 70 conventionally plugs into the receptacle outlet 52, the power circuitry 76 receives AC electrical power. The power circuitry 76 converts the AC electrical power into direct current ("DC") electrical power. The power circuitry 76 thus provides electrical power to the bi-modal modem 62 for sending and receiving both power and data using the power-line communications 50. The power circuitry 76 also provides electrical power to the radio circuitry 74 for sending and receiving cellular data signals.

The bridge unit 70 thus provides functional bridging of different communications standards. The bridge unit 70 receives electrical power and data using the power-line communications 50. The bridge unit 70 thus transforms the data (received using the power-line communications 50) into cellular data signals for wireless transmission using the radio circuitry 72. The bridge unit 70 thus functionally bridges power-line communications to cellular data communications. During local electrical power outages the bridge unit 70 operates as a modulator/demodulator, enabling data communication with the Alarm Controller 24.

As FIG. 7 also illustrates, the bridge unit 70 may also internally contain the backup battery 60. When the bridge unit 70 detects a failure of the AC electrical power from the receptacle outlet 52, the bridge unit 70 may switch an electrical connection to the backup battery 60. The backup battery 60 thus provides direct current electrical power to the bi-modal modem 62 to enable communications 50 during an electrical outage. The backup battery 60 may also provide the direct current electrical power to the radio circuitry 74, thus maintaining cellular data transmissions capability during the electrical outage. The backup battery 60 may also provide direct current electrical power to the power circuitry 76, if needed or desired. The bridge unit 70 may also include a processor 78 and memory 80 for determining an electrical outage, as later paragraphs will further explain.

Figure 8:
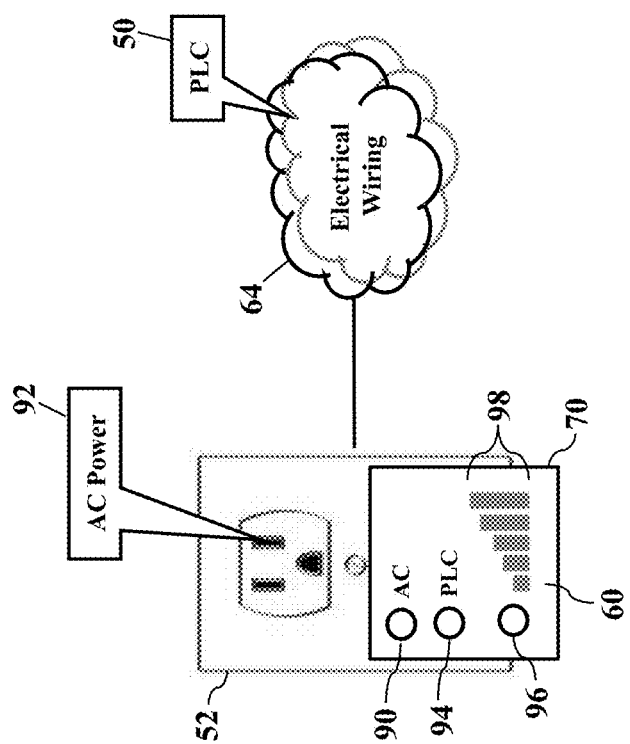
FIGS. 8-9 are schematics illustrating a portable bridge unit, according to exemplary embodiments.
Figure 9:
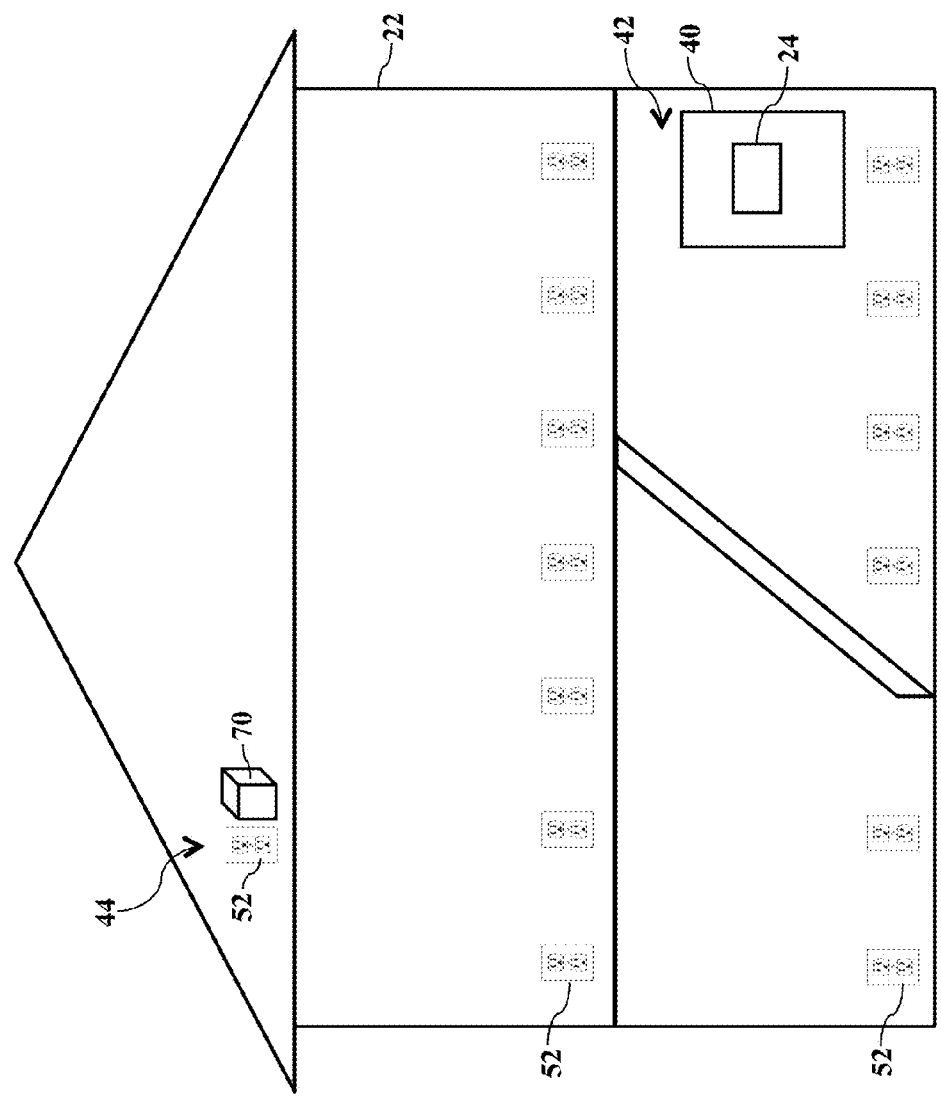

FIGS. 8-9 are schematics further illustrating the portable bridge unit 70, according to exemplary embodiments. Here the bridge unit 70 may include radio enhancements for cellular communications. FIG. 8 illustrates the bridge unit 70 inserted into the receptacle outlet 52. A first visual indicator 90 (such as a light emitting diode) illuminates to confirm the AC electrical power (illustrated as reference numeral 92) is received from the receptacle outlet 52. A "green" light, for example, indicates AC power is received from the receptacle outlet 52. A "red" light, though, may indicate no AC electrical power is detected, so the bridge unit 70 may be operable using the internal backup battery 60. A second visual indicator 94 (such as another light emitting diode) illuminates (green or red) to confirm the power-line communications 50 are operating. A third visual indicator 96 (such as more light emitting diodes) illuminates to indicate cellular operation. The bridge unit 70 may even have internal circuitry and programming for determining a signal strength of cellular data signals received from a nearby base station antenna (such as the wireless access point 38, illustrated in FIG. 1). FIG. 8 also illustrates a received signal strength indicator (or "RSSI"), such as the familiar bar graph 98. When the bridge unit 70 is plugged into the receptacle outlet 52, the bridge unit 70 may thus automatically determine and visually indicate the RSSI for cellular signals at that physical location.

FIG. 9 illustrates installation of the portable bridge unit 70. FIG. 9 schematically illustrates the building 22 as a residential home having many receptacle outlets 52 throughout its different floors and rooms. An installing technician merely activates the backup battery 60 in the pocket-sized bridge unit 70 and walks throughout the building 22. Even though the bridge unit 70 is not plugged into one of the receptacle outlets 52, the bridge unit 70 still operates under battery power (as above explained). The installing technician walks throughout the building 22 and monitors for a strong cellular RSSI at any one of the receptacle outlets 52. FIG. 9, for example, illustrates the bridge unit 70 proximate the electrical outlet 52 in the attic 44, which may often be a location of desired cellular reception. The installing technician, however, may choose any other receptacle outlet 52 near a window or exterior wall. Regardless, once an acceptable RSSI is observed, the installing technician then selects the corresponding receptacle outlet 52 and plugs in the bridge unit 70. The portable bridge unit 70 thus receives a strong cellular signal for wireless transmission/reception of alarm messages. As the bridge unit 70 is now receiving AC electrical power from the receptacle outlet 54, the portable bridge unit 70 may also revert or switch to AC operation.

Exemplary embodiments thus provide a PLC-to-CDT bridge. The bridge unit 70 functions as both a power supply and a wireless cellular data transceiver (or "CDT"). The bridge unit 70 thus converts cellular data signals to power-line communications or to modem communication during loss of electrical power. The bridge unit 70 also receives power-line communications and converts to cellular data. Exemplary embodiments thus operationally act as self-contained PLC-to-CDT bridging device. Installation time is greatly reduced, as new wire is not needed. Moreover, the quality of the installation is improved without damaging existing wiring and plumbing. The bridge unit 70 enables independent optimization of the location of the cellular data transceiver, independent of the alarm controller 24. The bridge unit 70 may thus be remotely located from the alarm controller 24 to maintain acceptable wireless reception. Remote location of the bridge unit 70 thus reduces, or eliminates, installation of signal repeaters and minimizes, or eliminates, wireless downtime (offline) issues. Moreover, as the bridge unit 70 may be optimally located (using the RSSI), more customers may qualify for cellular-based services. The bridge unit 70 thus provides a virtual Ethernet connection between the alarm controller 24 and the wireless transceiver 36 (such as a cellular data transceiver). Moreover, home-networking standards (such as G.hn) may be used with battery backup.

Exemplary embodiments also please customers. As most customers prefer to have the cabinet 40 (with the alarm controller 24) installed in an area hidden from general view, exemplary embodiments eliminate drilling and installation of new cable in the customer's home or office. The installing technician merely locates an electrical receptacle outlet 52 having desirable radio reception. All that is required is a quick, conventional insertion of the bridge unit 70 into the electrical receptacle outlet 52. The bridge unit 70 then begins communicating using the power-line communications 50. The installation is very quick and simple and requires no drilling. Minimal interruption pleases nearly every customer.

The bridge unit 70 thus reduces installation time and effort. The installing technician roams the premises and determines the best location for obtaining the optimizing RSSI. Because the bridge unit 70 is small in size, the bridge unit 70 easily installs in an AC outlet near a window and/or outside wall. The installing technician thus visually knows that the RSSI is "Good" or even better, based on installing an actual cellular data transceiver. The installing technician thus optimizes the location of the bridge unit 70 independently from optimizing the location of the alarm controller 24.

The bridge unit 70 is universal. As receptacle outlets are almost universally found throughout the world, the bridge unit 70 is easily adapted to any country and to any standard. In North America, for example, the male blades or pins 76 are standardized according to the National Electrical Manufacturers Association (or "NEMA"). However, Australia uses a different configuration, while the United Kingdom uses yet another different configuration. Exemplary embodiments, though, may be tailored to suit any size, number, and orientation of any country or standard.

Figure 10:
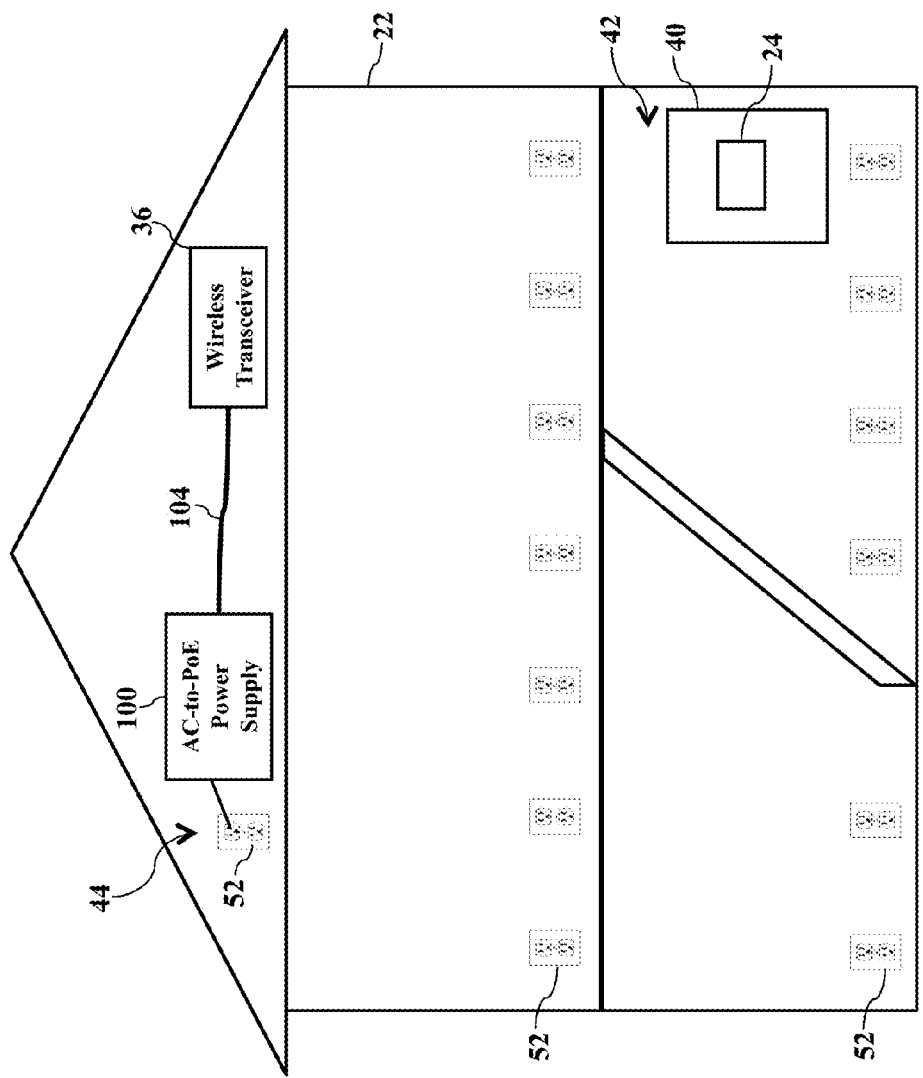
FIGS. 10-12 are schematics illustrating another bridging solution, according to exemplary embodiments.
Figure 11:
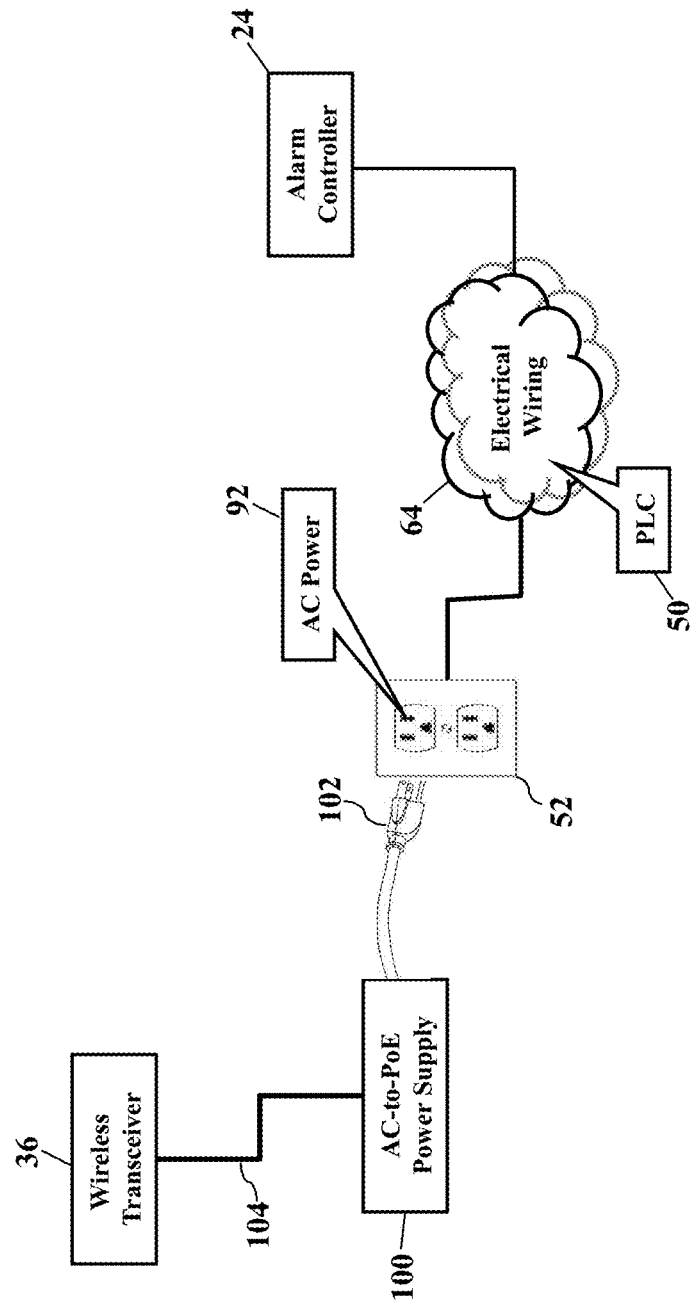
Figure 12:
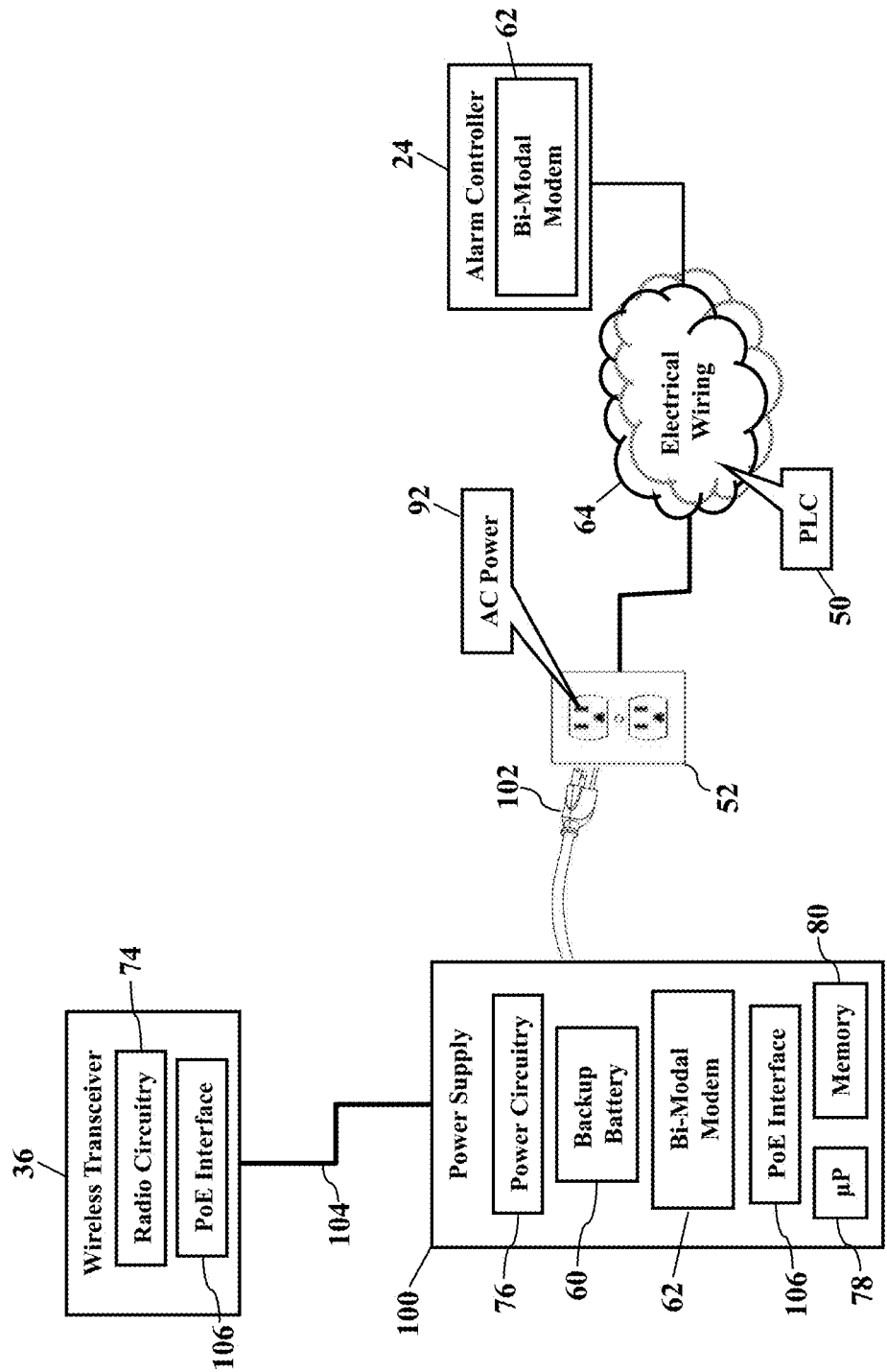

FIGS. 10-12 are schematics illustrating another bridging solution, according to exemplary embodiments. Here the wireless transceiver 36 may have a separate power supply 100. The AC-to-Power-over-Ethernet (PoE) power supply 100 plugs into any electrical receptacle outlet 52 using the familiar corded plug 102. An Ethernet cable 104 extends from the AC-to-Power-over-Ethernet (PoE) power supply 100 to the wireless transceiver 36 using industry standard Power-over-Ethernet technology which enables power and data communications to be simultaneously carried over the Ethernet cable (Cat5/6) 104. Exemplary embodiments thus provide another installation solution. There will be instances in which the location of desired cellular reception is not near an electrical outlet. For example, many attic or roof areas have limited access to electrical power. Indeed, many homes may only have a single electrical outlet 52 in the attic area. The location of this single electrical outlet 52, though, may not have adequate wireless reception. FIGS. 10-12 thus illustrate a cabling solution in which the wireless transceiver 36 may again be remotely located from the AC-to-Power-over-Ethernet (PoE) power supply 100. That is, the AC-to-Power-over-Ethernet (PoE) power supply 100 plugs into the (perhaps only) receptacle outlet 52 in some area (such as the attic 44, as FIG. 10 illustrates). The Ethernet cable 104 plugs into the power supply 100 and runs to the remote location of the wireless transceiver 36. Again, then, the installing technician may roam the premises and select the best location of signal strength. The wireless transceiver 36 is installed for best reception, and the Ethernet cable 104 is installed to the location of the AC-to-Power-over-Ethernet (PoE) power supply 100 at the receptacle outlet 52. The wireless transceiver 36 and the alarm controller 24 utilize the power-line communications 50 to convey alarm messages over the electrical wiring 64.

FIG. 12 illustrates more details. The AC-to-Power-over-Ethernet (PoE) power supply 100 may internally contain the power circuitry 76 for transforming the AC electrical power 92 (received from the electrical receptacle outlet 52) into the direct current ("DC") electrical power. The power circuitry 76 thus provides electrical power to a power-over-Ethernet ("PoE") interface 106, which conveys the electrical power to the wireless transceiver 36 over conductors in the Ethernet cable 104. The power circuitry 76 also provides electrical power to the internal bi-modal modem 62 for sending and receiving both power and data using the power-line communications 50. The power supply 100 thus provides electrical power over the Ethernet cable 104 to the radio circuitry 74 in the wireless transceiver 36.

Exemplary embodiments thus provide a PLC-to-PoE-to-CDT bridge. The AC-to-Power-over-Ethernet (PoE) power supply 100 receives both power and data using the power-line communications 50 from the electrical receptacle outlet 52. The AC-to-Power-over-Ethernet (PoE) power supply 100 may then perform a first conversion or transformation from power-line communications to power-over-Ethernet. Data and messages are thus conveyed over the Ethernet cable 104 to the wireless transceiver 36. The wireless transceiver 36 also has the power-over-Ethernet ("PoE") interface 106 for sending and receiving data and power. The wireless transceiver 36 then sends and receives the data and messages using cellular radio techniques. Exemplary embodiments thus perform two transformations from power-line communications to power-over-Ethernet and then a second transformation to cellular data transmission.

As FIG. 12 also illustrates, the AC-to-Power-over-Ethernet (PoE) power supply 100 may also internally contain the backup battery 60. When the power supply 100 detects a failure of the AC electrical power 92 from the receptacle outlet 52, the AC-to-Power-over-Ethernet (PoE) power supply 100 may switch to the backup battery 60. The backup battery 60 provides direct current electrical power to the internal bi-modal modem 62, thus maintaining the data communications 50 during an electrical outage. The backup battery 60 may also provide the direct current electrical power to the power-over-Ethernet ("PoE") interface 106, thus maintaining Ethernet communications with the wireless transceiver 36 during the electrical outage. The backup battery 60 may also provide the direct current electrical power to the power conductors in the Ethernet cable 104, thus also powering the wireless transceiver 36 during the electrical outage. However, the wireless transceiver 36 may have its own internal backup battery 60.

The AC-to-Power-over-Ethernet (PoE) power supply 100 may have networking details. As the AC-to-Power-over-Ethernet (PoE) power supply 100 may connect to the Ethernet cable 104, the power supply 100 may include any connector that accepts the Ethernet cable 104. The AC-to-Power-over-Ethernet (PoE) power supply 100, for example, may have a female data jack that accepts a male plug (such as RJ-56). The female data jack has multiple electrical pins, some of which may be energized with the direct current battery power provided by the backup battery 60. The Ethernet cable 104 may thus easily insert into the AC-to-Power-over-Ethernet (PoE) power supply 100 using familiar networking components.

The AC-to-Power-over-Ethernet (PoE) power supply 100 may have other components. The AC-to-Power-over-Ethernet (PoE) power supply 100, for example, may have a relay. The relay is ordinarily energized by either AC power or the DC power transformed by the power supply 100. However, when the power supply 100 fails to receive the AC power, or fails to transform the DC power, the relay de-energizes. De-energization opens or closes the relay (depending on design). Regardless, de-energization causes the relay to switch into electrical contact with the backup battery 60, which also electrically connects the direct current battery power to the bi-modal modem 62, to the female data jack (above explained), and/or to the blades or pins of the corded plug 102 that insert into the electrical receptacle outlet 52. The data communications 50 is thus maintained during a failure, as above explained.

Figure 13:
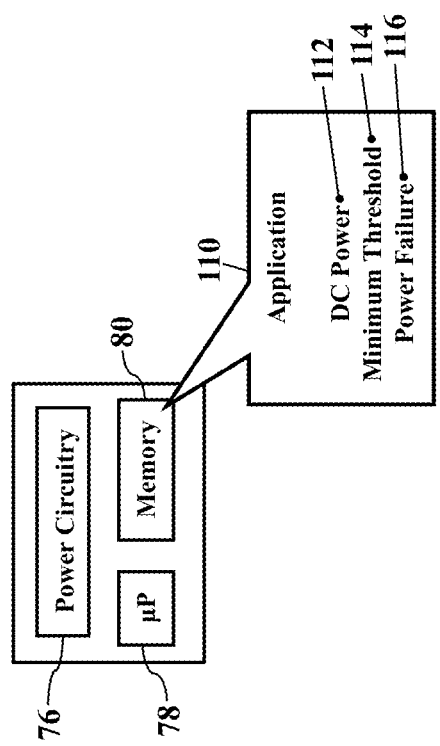
FIGS. 13-14 are schematics illustrating more details of power-line communications, according to exemplary embodiments.
Figure 14:
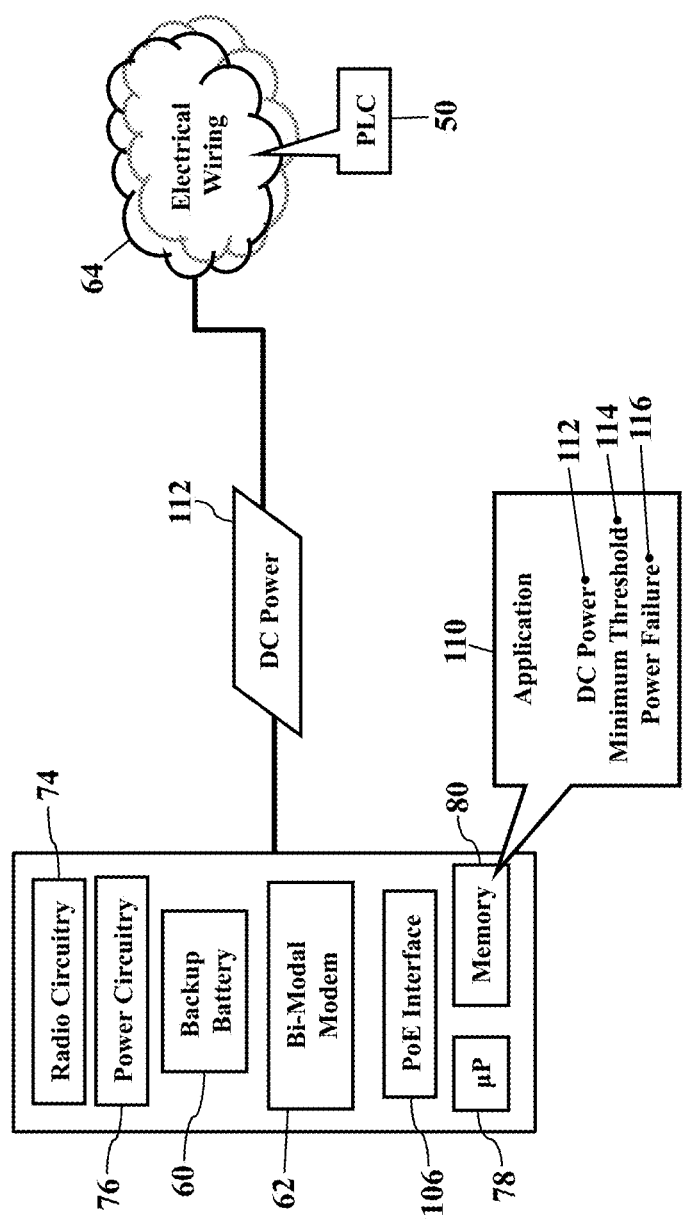

FIGS. 13-14 are schematics illustrating more details of power-line communications, according to exemplary embodiments. FIG. 13 illustrates the processor 78 and memory 80 contained within the bridge unit 70 and/or the power supply 100. Regardless, the processor 78 (e.g., "μP"), application specific integrated circuit (ASIC), or other component executes an application 110 stored in the memory 80. The application 110 includes instructions or code that causes the processor 78 to perform operations, such as monitoring the DC electrical power 112 transformed by the power circuitry 76. The application 110 instructs the processor 78 to periodically, continually, or randomly compare the DC electrical power 112 to a minimum threshold 114. Should the DC electrical power 112 fall below the minimum threshold 114, the application 110 may infer a power failure 116. For example, the power failure 116 may indicate an error or failure of the power circuitry 76, a tripped circuit breaker in the electrical wiring (illustrated as reference numeral 64 in FIG. 12), or an outage in the electrical grid. Whatever the cause, the minimum threshold 114 indicates some failure in power.

FIG. 14 illustrates energization. Once the power failure 116 is determined, the application 110 may revert to backup power from the backup battery 60. Some of the direct current ("DC") battery power 112 may be provided to the radio circuitry 74, to the power circuitry 76, to the bi-modal modem 62, and/or to the power-over-Ethernet ("PoE") interface 106. However, some of the direct current battery power 112 may additionally or alternatively be provided to the electrical wiring 64. The backup battery 60 may thus be physically or inductively connected to energize the electrical wiring 64. Even though the power failure 116 is detected, energization of the electrical wiring 64 may also maintain the power-line communications 50. For example, some of the DC battery power 112 may be applied to the blades or pins 76 (as illustrated with reference to FIG. 5) or the corded plug 102 (as illustrated with reference to FIGS. 11-12). The DC battery power 112 thus energizes the receptacle outlet 52 (and/or thus the electrical wiring 64) to maintain the power-line communications 50 during a failure.

The security system 20 remains functional during outages. The electrical grid ordinarily transforms higher voltage (or "medium voltage") sections (approximately 1,000 Volts to 100,000 Volts) into low voltage sections (typically 120 Volts) that serve each premise. Each home or business has the electrical wiring 56 that distributes electrical common, neutral, and ground wires to each electrical receptacle outlet 52. However, during an electrical outage, the power-line communications 50 may ordinarily be inoperative. Exemplary embodiments, though, use the backup battery 60 to maintain the data communications 50.

Exemplary embodiments thus provide an elegant solution. Power-line communications ordinarily modulate and demodulate a carrier signal with digital data onto the base 50 Hz or 60 Hz alternating current (AC) electrical power. However, during an electrical power failure, the electrical wiring 64 is de-energized, so the power-line communications 50 ordinarily fail. Exemplary embodiments, instead, apply the backup battery 60 to keep the bi-modal modem 62 operational during power outages. Exemplary embodiments thus remain compliant with standard UL 985, which specifies requirements for household fire warning system units.

Exemplary embodiments may be applied to any networking component. The power supply 100, for example, may interface with a camera, microphone, printer, router, or any networking component. The Ethernet cable 104, in other words, may extend from the power supply 100 to any networking component. The power supply 100 receives both power and data using the power-line communications 50 from the electrical receptacle outlet 52. The power supply 100 performs a transformation from power-line communications to power-over-Ethernet, thus conveying the data and electrical power over the Ethernet cable 104. The networking component also has the power-over-Ethernet ("PoE") interface 106 for interfacing with the Ethernet cable 104, thus receiving the data and power. If the power supply 100 detects the power failure 116, the power supply 100 uses the backup battery 60 to maintain the data communications 50 in the electrical wiring 56. So, exemplary embodiments may be used to maintain video, audio, routing, printing, and any other functions during electrical outages. Exemplary embodiments may thus energize the power-line communications 50 using any serial and/or parallel combination of one or more different backup batteries 60.

Figure 15:
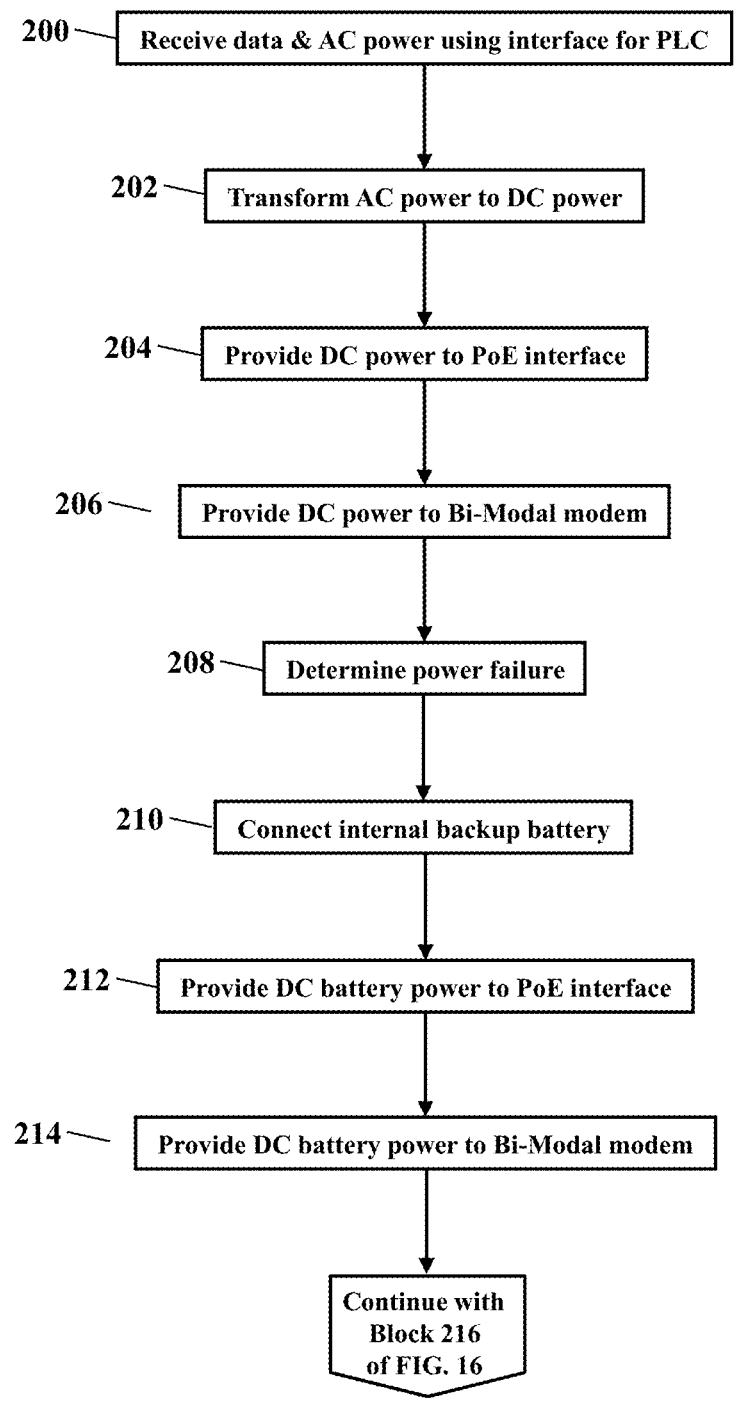
FIGS. 15-16 are flowcharts illustrating a method or algorithm for power-line communications, according to exemplary embodiments.
Figure 16:
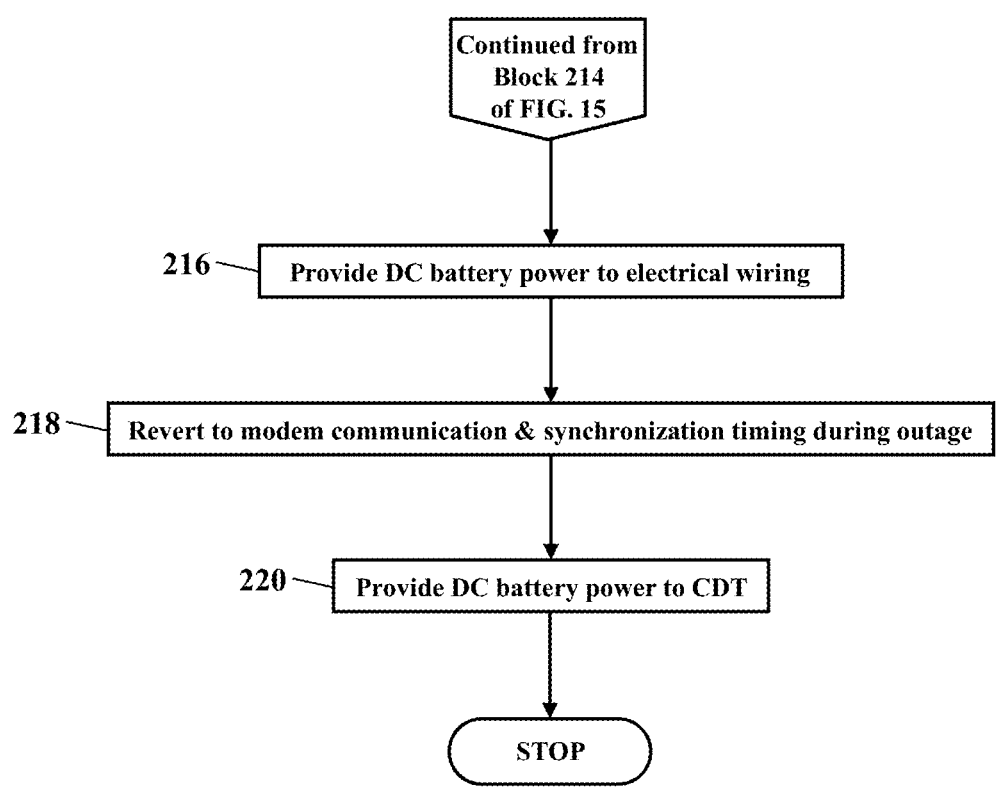

FIGS. 15-16 are flowcharts illustrating a method or algorithm for power-line communications, according to exemplary embodiments. Data and alternating current electrical power are received using an interface for power-line communications (Block 200). The alternating current electrical power is transformed into direct current electrical power (Block 202). The direct current electrical power is provided to a power over Ethernet ("PoE") interface (Block 204) and to the bi-modal modem 62 (Block 206). When the power failure 116 is determined (Block 208), an electrical connection is made to the internal backup battery 60 for direct current battery power (Block 210). The direct current battery power is provided to the power over Ethernet ("PoE") interface (Block 212) and to the bi-modal modem 62 (Block 214).

The flowchart continues with FIG. 16. The direct current battery power may also be provided to the electrical wiring 64 (Block 216). The direct current battery power maintains the power-line communications 50 during the failure (Block 218). The direct current battery power may also be provided to the cellular data transceiver ("DCT") (Block 220)

Figure 17:
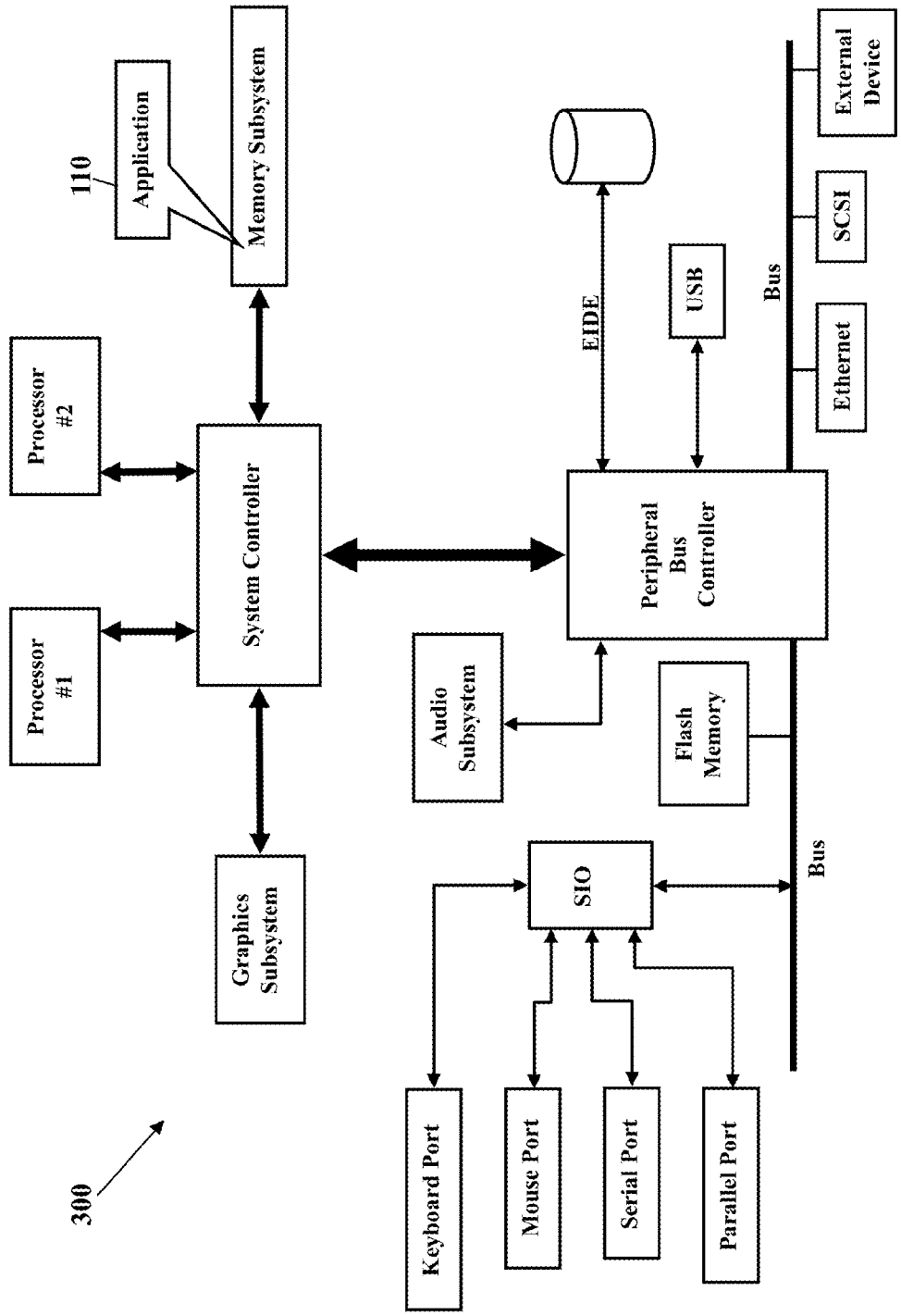
FIG. 17 is a schematic illustrating another operating environment, according to still more exemplary embodiments.

FIG. 17 is a schematic illustrating still more exemplary embodiments. FIG. 17 is a more detailed diagram illustrating a processor-controlled device 300. As earlier paragraphs explained, exemplary embodiments may operate in any processor-controlled device. FIG. 17, then, illustrates the application 110 stored in a memory subsystem of the processor-controlled device 300. One or more processors communicate with the memory subsystem and execute either, some, or all applications. Because the processor-controlled device 300 is well known to those of ordinary skill in the art, no further explanation is needed.

Exemplary embodiments may be applied regardless of networking environment. Exemplary embodiments may be easily adapted to cellular, WI-FI®, BLUETOOTH®, and/or near-field networking technologies, as this disclosure explains. Indeed, exemplary embodiments may utilize any portion of the electromagnetic spectrum and any signaling standard (such as the IEEE 802 family of standards, GSM/CDMA/TDMA or any cellular standard, and/or the ISM band). Exemplary embodiments may use the radio-frequency domain and/or the Internet Protocol (IP) domain. Exemplary embodiments may be applied to electrical powerline wiring and/or any distributed computing network, such as the Internet (sometimes alternatively known as the "World Wide Web"), an intranet, a local-area network (LAN), and/or a wide-area network (WAN). Exemplary embodiments may be applied regardless of physical componentry, physical configuration, or communications standard(s).

Exemplary embodiments may utilize any processing component, configuration, or system. The processor 78 may be one or multiple processors, which could include distributed processors or parallel processors in a single machine or multiple machines. The processor 78 may be used in supporting a virtual processing environment. The processor 78 could include a state machine, application specific integrated circuit (ASIC), programmable gate array (PGA) including a Field PGA, or state machine. When the processor 78 executes instructions to perform "operations", this could include the processors performing the operations directly and/or facilitating, directing, or cooperating with another device or component to perform the operations.

Exemplary embodiments may be physically embodied on or in a computer-readable storage medium. This computer-readable medium may include CD-ROM, DVD, tape, cassette, floppy disk, memory card, USB, and large-capacity disks. This computer-readable medium, or media, could be distributed to end-subscribers, licensees, and assignees. A computer program product comprises processor-executable instructions for direct current energization, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
receiving, by a wireless transceiver, messages sent from an alarm controller associated with a security system, the messages modulated onto direct current electrical power conveyed along electrical wiring;
energizing, by the wireless transceiver, a bi-modal modem with direct current battery power supplied by an internal backup battery, the bi-modal modem operative using both alternating current electrical power and the direct current battery power;
demodulating, by the wireless transceiver, the messages from the direct current electrical power; and
wirelessly transmitting, by the wireless transceiver, the messages via a cellular network.

2. The method of claim 1, further comprising determining a failure of the alternating current electrical power.

3. The method of claim 2, further comprising connecting to the internal backup battery in response to a failure of the alternating current electrical power.

4. The method of claim 3, further comprising transmitting the messages from the wireless transceiver using the direct current battery power supplied by the internal backup battery.

5. The method of claim 1, further comprising modulating the messages using the direct current battery power.

6. The method of claim 5, further comprising powering an interface for power-over-Ethernet communications.

7. The method of claim 1, further comprising transforming the alternating current electrical power into the direct current electrical power.

8. A method, comprising:
receiving, at a bridge unit, alarm messages sent from an alarm controller, the alarm messages modulated onto alternating current electrical power using an interface for power-line communications;
wirelessly transmitting, by the bridge unit, the alarm messages;
determining, by the bridge unit, a failure of the alternating current electrical power;
switching, by the bridge unit, to an internal backup battery in response to the failure of the alternating current electrical power;
energizing, by the bridge unit, the interface for the power-line communications with direct current battery power supplied by the internal backup battery to maintain the power-line communications;
energizing, by the bridge unit, an internal wireless transceiver with the direct current battery power supplied by the internal backup battery; and
determining, by the bridge unit, a strength of a signal received by the wireless transceiver while energized with the direct current battery power supplied by the internal backup battery.

9. The method of claim 8, further comprising powering a modem with the direct current battery power to maintain communications with the alarm controller.

10. The method of claim 9, further comprising powering an interface for power-over-Ethernet communications between the modem and the internal wireless transceiver.

11. The method of claim 8, further comprising transforming the alternating current electrical power into the direct current electrical power.

12. The method of claim 8, further comprising energizing a conductor in an Ethernet cable with the direct current battery power supplied by the internal backup battery.

13. The method of claim 8, further comprising demodulating the alarm messages from the alternating current electrical power.

14. A bridge unit, comprising:
a power circuit;
a cellular data transceiver;
a backup battery;
an enclosure internally housing the power circuit, the cellular data transceiver, and the backup battery;
a processor; and
a memory device, the memory device storing instructions, the instructions when executed causing the processor to perform operations, the operations comprising:
receiving data sent from an alarm controller, the data modulated onto alternating current electrical power using an interface for power-line communications;
determining a failure of direct current electrical power transformed from the alternating current electrical power by the power circuit;
switching to the backup battery in response to the failure of the direct current electrical power;
powering the cellular data transceiver with direct current battery power supplied by the backup battery, the direct current battery power maintaining cellular communications via the cellular data transceiver; and
powering the interface for the power-line communications with the direct current battery power supplied by the backup battery.

15. The bridge unit of claim 14, wherein the operations further comprise determining a strength of a cellular signal received by the cellular data transceiver.

16. The bridge unit of claim 15, further comprising a visual indicator of the strength of the cellular signal received by the cellular data transceiver.

17. The bridge unit of claim 14, wherein the operations further comprise determining a strength of a cellular signal received by the cellular data transceiver while powered by the direct current battery power supplied by the backup battery.

18. The bridge unit of claim 17, further comprising a visual indicator of the strength of the cellular signal received by the cellular data transceiver.

19. The bridge unit of claim 14, further comprising a modem internally housed within the enclosure, the modem demodulating the data from the alternating current electrical power.

* * * * *